(No Model.) 2 Sheets—Sheet 1.
G. A. LYNCKER.
CAR COUPLING.
No. 551,128. Patented Dec. 10, 1895.
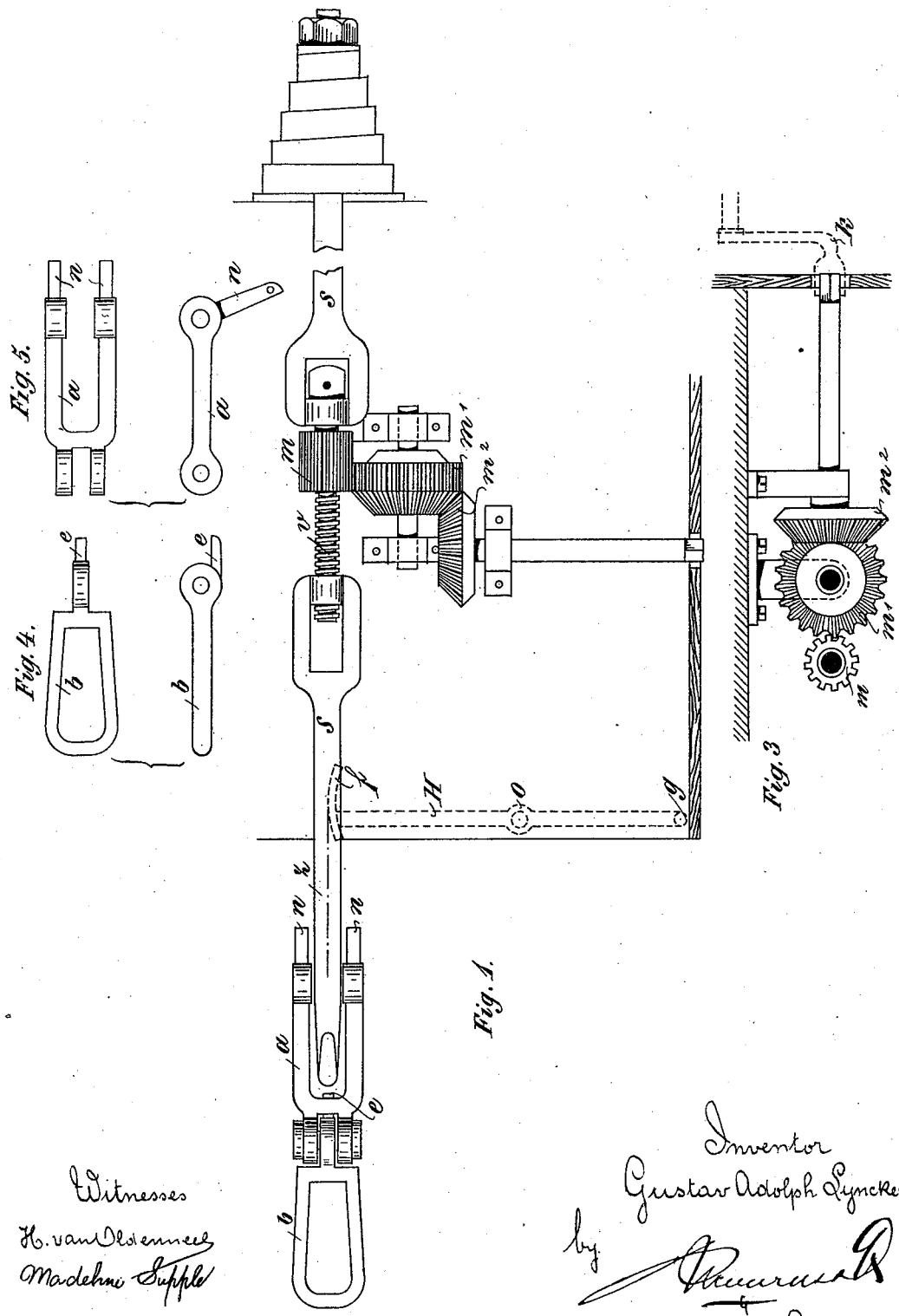
Witnesses
H. van Oldenneel
Madeline Supple
Inventor
Gustav Adolph Lyncker
by
Attorney

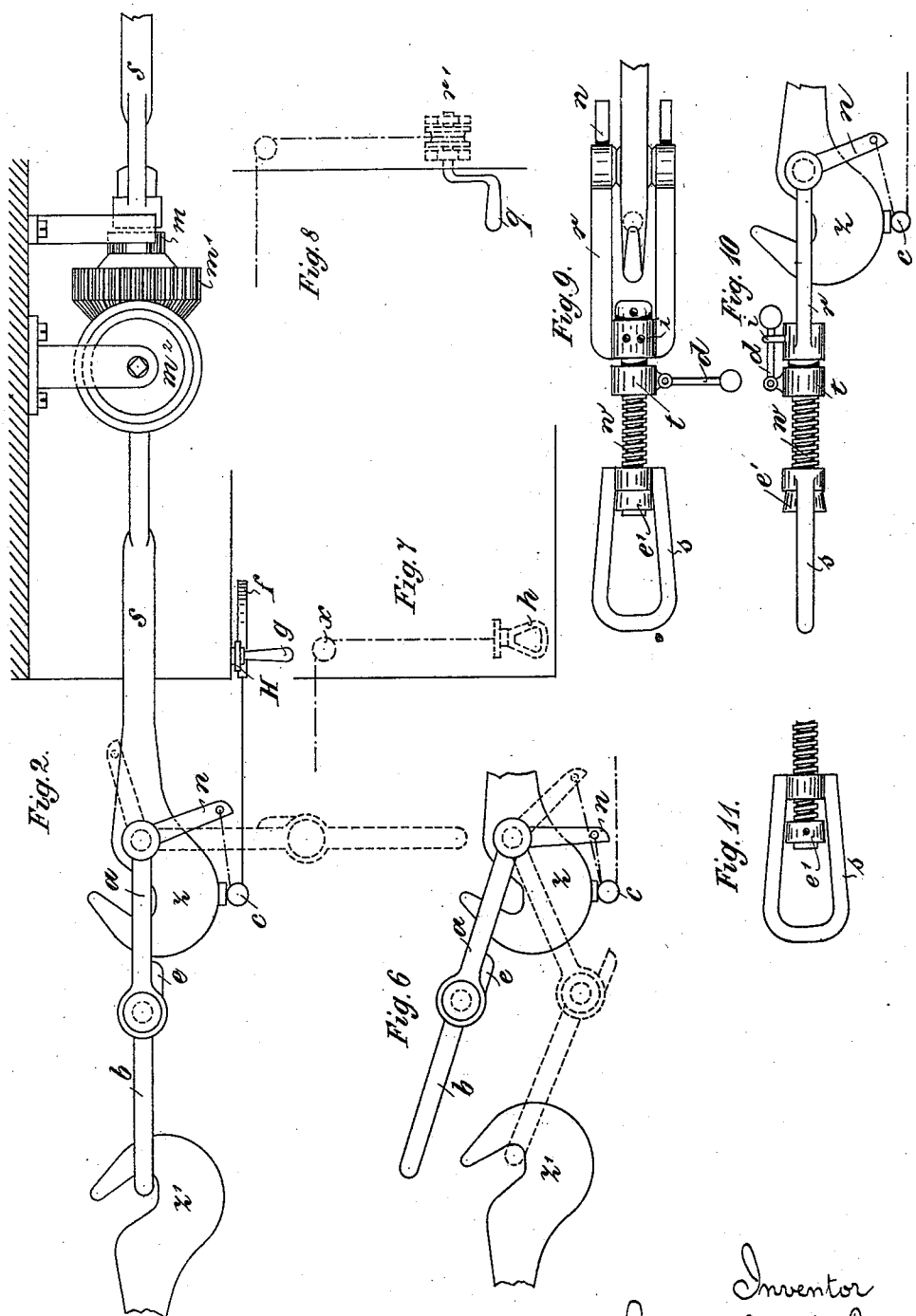

United States Patent Office.

GUSTAV ADOLPH LYNCKER, OF MUNICH, GERMANY.

CAR-COUPLING.

SPECIFICATION forming part of Letters Patent No. 551,128, dated December 10, 1895.

Application filed April 27, 1895. Serial No. 547,416. (No model.)

*To all whom it may concern:*

Be it known that I, GUSTAV ADOLPH LYNCKER, a citizen of the Kingdom of Bavaria, and a resident of the city of Munich, Bavaria, Germany, have invented certain new and useful Improvements in Couplings for Railroad-Cars, of which the following is a specification.

Accidents that happen during the coupling or uncoupling of raiload-cars would not occur if the work of coupling the cars was done at the side of the same, and this is the object of the present invention.

As seen in Figure 1, the bail $a$ is connected to the draw-hook $z$ by a bolt, and this bail is provided with two arms $n$, forming an obtuse angle, which are each provided with an opening for receiving the wire band. The latter is drawn through an eye $c$, Fig. 2, which is located below the hook $z$, and the wire runs back toward the sides of the car, as can be seen in the drawings. The bail $b$ is pivotally connected with the bail $a$, and is provided with the lug $e$, which rests under the forward part of the bail $a$.

Fig. 2, in dotted lines, shows the bail when not in use, in a free depending position. If the said bail is to be used, it is raised by a draw or wire band from the side of the car. As will be seen from Fig. 7, the wire band can be guided by means of a pin $x$ or a ring with a roller located behind the same at the lower side of the car and from there conducted to a handle $h$ at the side of said car, whereby by simply pulling or letting out the raising or lowering of the bail is operated; or it is possible to lead the band over a small pulley $r'$, whereby by simply turning the cranked handle $q$, Fig. 8, the bail will be raised or lowered. A further arrangement for raising the bail is shown in Figs. 1 and 2, in which a two-armed lever H is provided with a segment $f$, Fig. 1, over which the wire band extends, and the lever H is turned around the point $o$ from the side of the car by means of a handle $g$, so that the coupling can be made without danger.

Fig. 6 shows the bail in its highest position ready to drop into the hook $z'$. The position in dotted lines shows the bail when engaged in the hook, and Fig. 2 shows the coupling when all ready.

In order to get the coupling in the position shown in Fig. 2, where the train or the like can start, another operation is required—namely, the locking of the coupling. In order to do this from the side, the draw-rod S is divided and connected by means of a screw V, the end of which is provided with a toothed nut $m$. (See Fig. 1.) The same is operated by the removable handle $k$, Fig. 3, and the gears $m'$ $m^2$, and in consequence thereof the hook will be locked. The locking apparatus, as can be seen from the drawings, is placed at the bottom of the car and does not interfere in any way with the work, while being very easy to handle.

Another manner of coupling the cars without danger is shown in Figs. 9, 10, and 11. In this case the bail $r$ is provided with arms with an obtuse projection $n$ and holes for receiving the wire bands. The screw-thread $w$ is operated by means of a movable handle $d$ on the head $t$ and connects the bail $r$ with the bail $s$, of which one part is provided with a screw $w$. At the end of the screw a conical ring $e'$, Fig. 11, is screwed, which is pressed into the bail $s$ when the coupling is loosened. This is made to prevent the bail $s$ from turning around when hanging down, which is also the object of the pins $i$ for the bail $r$, and which is caused by simply changing the position of the lever $d$, (see Figs. 9 and 10,) in order that the bail be always horizontal when it must be attached. The locking and opening of the coupling must always be used, so that the workman steps in between two cars, as usual; but as the locking of the coupling occurs only before the departure of a train when the same has come to a standstill there is no particular danger during the coupling or uncoupling in the manner as described after the hanging in or taking out of the bail has already been done from the side.

I claim—

In a car coupling, the draw bar having the hooked head, the bail pivoted thereto and having downwardly extending arms on each side of the hooked head, the cord or flexible connection for operating the link and the guide or eye therefor beneath the said head of the draw bar and intermediate of the lower ends of the arms, substantially as described.

In testimony that I claim the foregoing as my invention I have signed my name in presence of two subscribing witnesses.

GUSTAV ADOLPH LYNCKER.

Witnesses:
ALBERT WEICKMANN,
CARL MAYER.